United States Patent [19]

Zentner et al.

[11] Patent Number: 5,738,471
[45] Date of Patent: Apr. 14, 1998

[54] TIE DOWN ASSEMBLY

[75] Inventors: Edward Zentner, Clarkston; Jerry J. McCammon, Rochester Hills, both of Mich.

[73] Assignee: Durakon Industries, Inc., Lapeer, Mich.

[21] Appl. No.: 583,237

[22] Filed: Jan. 5, 1996

[51] Int. Cl.$^6$ ................................................ B60P 7/08
[52] U.S. Cl. .................... 410/110; 410/101; 410/106
[58] Field of Search ..................... 410/101, 106, 410/108, 110, 107; 411/341, 342, 343; 24/68 CD, 265 CD, 115 K; 248/499, 503; 296/43

[56] References Cited

U.S. PATENT DOCUMENTS

| | | | |
|---|---|---|---|
| 3,302,508 | 2/1967 | Topf | 411/341 |
| 3,351,356 | 11/1967 | Clark et al. | 410/110 |
| 3,421,726 | 1/1969 | Getter | 410/110 |
| 3,694,866 | 10/1972 | Maier . | |
| 3,764,177 | 10/1973 | Woodward | 296/43 |
| 3,950,010 | 4/1976 | Robertson | 410/110 |
| 4,161,335 | 7/1979 | Nix et al. . | |
| 4,457,653 | 7/1984 | Leib | 411/342 |
| 4,915,556 | 4/1990 | Unger | 410/110 |
| 4,948,311 | 8/1990 | St. Pierre et al. | 410/107 |
| 5,141,277 | 8/1992 | Alexander . | |
| 5,326,203 | 7/1994 | Cockrell | 410/110 |

FOREIGN PATENT DOCUMENTS 836852  3/1970  Canada ........................... 410/101

*Primary Examiner*—Frank E. Werner
*Assistant Examiner*—Stephen Gordon
*Attorney, Agent, or Firm*—Brinks Hofer Gilson & Lione

[57] ABSTRACT

A cargo tie down assembly for disposition in the stake opening of a pickup truck or similar vehicle facilitates ready installation, secure mounting and easy removal. The tie down assembly includes a plastic base member having a flange which overlies the stake opening on the truck bed rail and a centering projection depending from the flange which is substantially complementarily to the size and shape of the stake opening and centers the member therewithin. The tie down also includes an integrally formed eyelet and flange member having an elongate threaded member which receives a conventional expandable toggle assembly. A through opening in the flange member receives the toggle and threaded member and a split collar on the flange member allows expansion of the toggle and its retention under the rail of the truck.

21 Claims, 5 Drawing Sheets

TIE DOWN ASSEMBLY

BACKGROUND OF THE INVENTION

The invention relates generally to tie downs for vehicles and more specifically to a readily securable and removable tie down assembly for disposition in the stake openings of a pickup truck or similar vehicle.

One of the keys to the extraordinary contemporary popularity of pickup trucks is their flexibility. The basic pickup truck is readily adaptable and can be customized to suit an exceptionally broad range of applications. This adaptability is enhanced by a correspondingly broad range of accessory equipment for pickup trucks including, for example, bed liners, caps, tonneau covers and load hold down and stabilizing devices.

Of this accessory equipment, the bed liner is perhaps the most commonly utilized. The bed liner protects the floor and sidewalls of the cargo bed from dents and damage caused by shifting cargo and, by protecting the bed from both damage and water, tends to alleviate rusting. Such bed liners thus maintain the integrity and appearance of the truck bed and significantly increase the vehicle's resale value.

A second accessory commonly used with both pickup trucks and pickup trucks having bed liners are cargo tie downs. Tie downs may generally be characterized as eyelets having mounting means adapting them to disposition on the rails of the truck bed sidewalls for receiving straps, ropes or cables for securing a load in the truck bed. Before the advent of bed liners, such tie downs were often secured directly and substantially permanently to the vehicle by, for example, threaded fasteners.

The popularity of bed liners has, however, complicated the installation of tie downs from at least two standpoints. First of all, bed liners tend to be installed and removed more frequently than tie downs. Since tie downs must necessarily be located on, that is, above, the bed liner, if the bed liner is to be removed, the tie downs must first be removed. Secondly, and perhaps of even greater significance, the disparate expansion rates of the vehicle bed which is fabricated of steel and the bed liner which, is typically fabricated of a polymer such as high density polyethylene (HDPE), creates a problem which is at the very least cosmetic but can be harmful to the bed liner. If tie downs are secured on or through a bed liner to the truck rail in cool weather, an increase in ambient temperature will result in a significantly greater expansion of the bed liner than the metal vehicle rail resulting in bowing of the bed liner between the tie downs since the bed liner expands at a significantly greater rate than the metal rail of the vehicle. As the ambient temperature returns to that at which the parts were assembled, the bowing will disappear. On the other hand, if the components are assembled in hot weather, the bed liner will attempt to contract far more than the rails. If the dimensional difference becomes great enough, cracking of the bed liner may result.

In view of the foregoing, it is apparent that improvements in the art of truck rail tie down assemblies are desirable.

SUMMARY OF THE INVENTION

A cargo tie down assembly for disposition in the stake opening of a pickup truck or similar vehicle facilitates ready installation, secure mounting and easy removal. The tie down assembly includes a plastic base member having a flange which overlies the stake opening on the truck bed rail and a centering projection depending from the flange which is substantially complementarily to the size and shape of the stake opening and centers the base member therewithin. The base member also includes a through opening and a pair of opposed C-shaped walls which define axially extending slots about the through opening.

The tie down assembly also includes an integrally formed eyelet and flange member having an elongate threaded member which receives a conventional, spring biased expandable toggle assembly. The through opening in the base member receives the toggle assembly and threaded member and a split collar on the flange member allows expansion of the toggle assembly and its retention under the rail of the truck. The base member is configured to inhibit compressive contact between the eyelet flange and the bed liner so that the bed liner has limited freedom of motion and to prevent damage to the bed liner. Auxiliary sizing rings having an inner opening complementary to the centering projection exterior define exterior dimensions and shapes complementary to various stake openings on trucks to adapt the base member thereto.

It is thus an object of the present invention to provide a tie down assembly for installation in the stake opening in the rail of a truck such as a pickup truck.

It is a further object of the present invention to provide a tie down assembly which may be both quickly installed and removed from a vehicle.

It is a still further object of the present invention to provide a tie down assembly which also positions and retains a bed liner in the bed of a pickup truck or similar vehicle.

It is a still further object of the present invention to provide a tie down assembly which positions a bed liner in the bed of a pickup truck or similar vehicle which does not clamp the bed liner to the vehicle.

It is a still further object of the present invention to provide a tie down assembly adaptable to a wide range of stake opening shapes and sizes through the use of adapter or sizing rings.

It is a still further object of the present invention to provide a tie down assembly which will not mark or damage the bed liner in the pickup truck.

Further objects and advantages of the present invention will become apparent by reference to the following description of the preferred embodiment and appended drawings wherein like reference numerals refer to the same component, element or feature.

DESCRIPTION OF THE PREFERRED EMBODIMENTS

Figure 1:
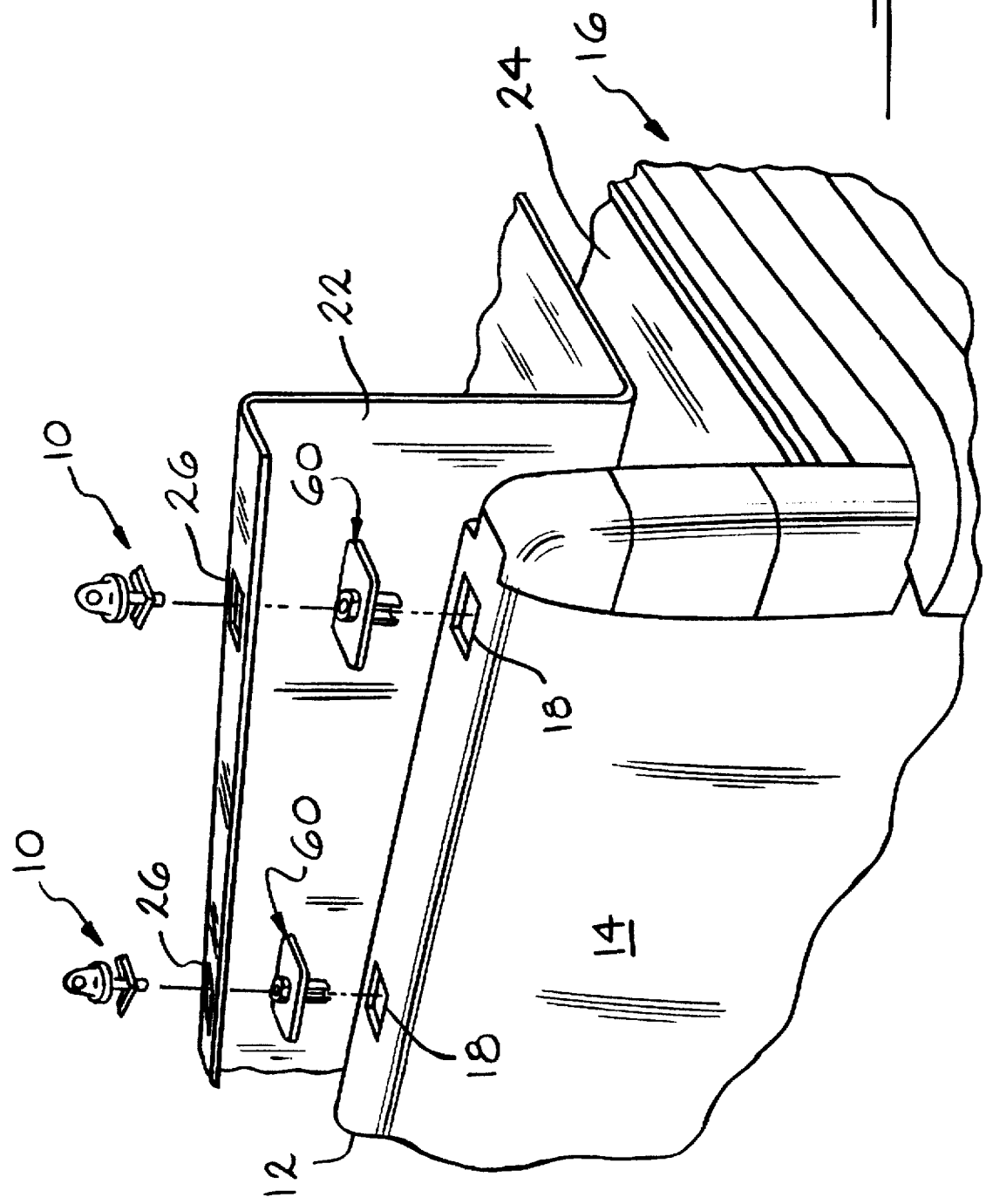
FIG. 1 is a fragmentary, perspective view of a portion of a pickup truck bed and bed liner with tie down assemblies according to the present invention.

Referring now to FIG. 1, a pair of tie down assemblies are illustrated and generally designated by the reference numeral 10. The tie down assemblies 10 are illustrated in preassembly configuration adjacent a rail 12 of a sidewall 14 of a typical pickup truck 16. The rail 12 includes a plurality of stake openings 18, two of which are illustrated in FIG. 1. The stake openings 18 are typically rectangular and are disposed in the rail 12 with their longer dimension oriented longitudinally. Typically, a bed liner 22 will be positioned in the truck bed 24. The bed liner 22 includes apertures 26 arranged and sized to align with the stake openings 18 when the bed liner 22 is properly seated within the bed 24 of the pickup truck 16.

Figure 2:
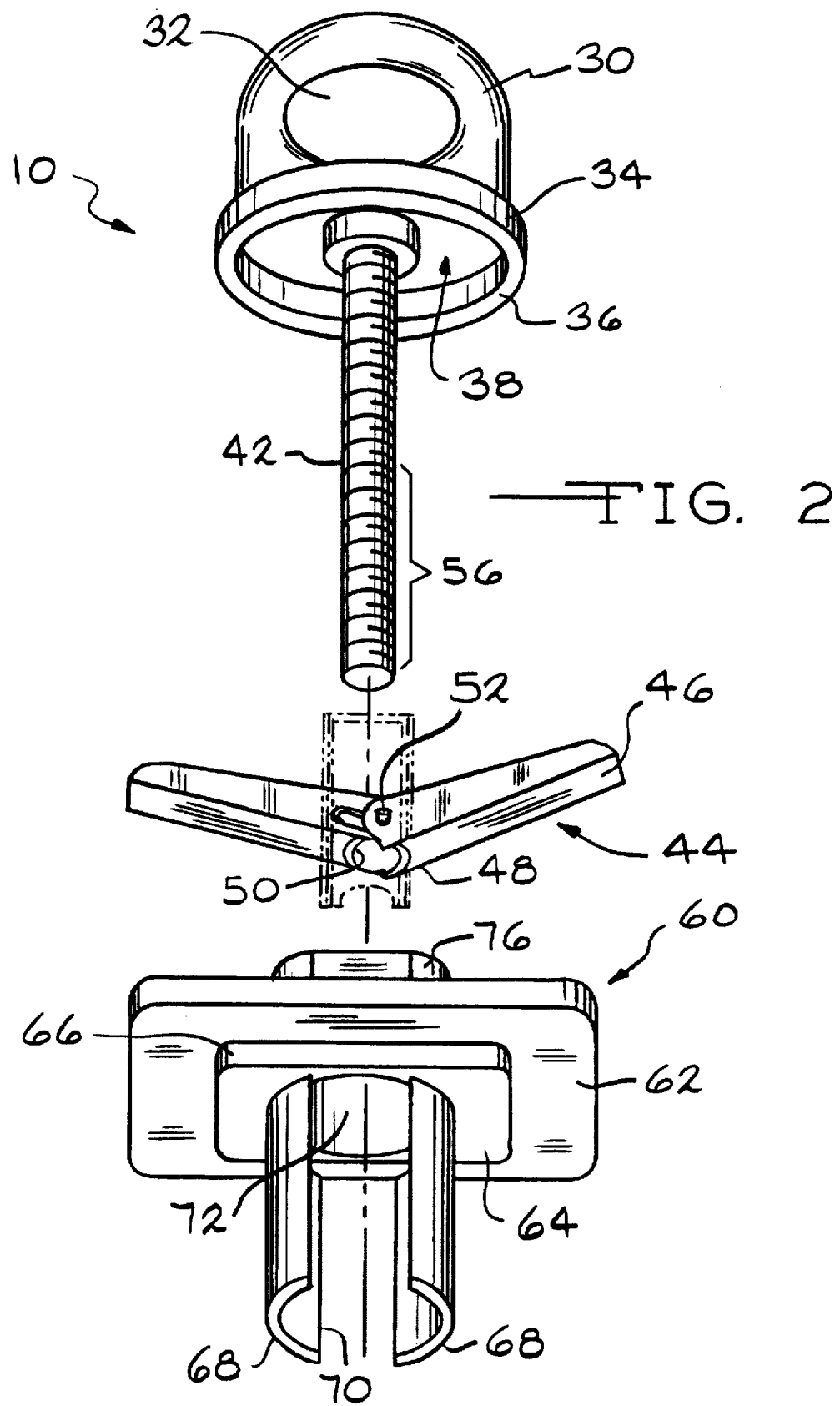
FIG. 2 is an exploded, perspective view of a tie down assembly according to the present invention.

Referring now to FIG. 2, one of the tie down assemblies 10 is illustrated and includes an eyelet or tie down member 30 fabricated from metal and defining a through aperture 32 which is suitably sized to receive straps, ropes or cables as will be readily appreciated. The eyelet member 30 also includes a preferably circular base 34. The circular base 34 includes a peripheral depending rim 36 which defines a cylindrical re-entrant region 38. The eyelet member 30 also includes an elongate threaded rod 42 which extends from the center of the circular base 34. The elongate threaded rod 42 may either be cast in place in the eyelet member 30 or may be received within a complementarily threaded blind aperture. A conventional spring biased toggle assembly 44 includes a pair of wings 46 and a centrally disposed collar 48 having threads 50 complementary to the threads of the threaded rod 42. The collar 48 also includes a pair of diametrally opposed lugs 52 which function as pivots for the two wings 46 of the toggle assembly 44 as will be readily appreciated. The two wings 46 are shown in phantom lines in their collapsed positions.

Figure 3:
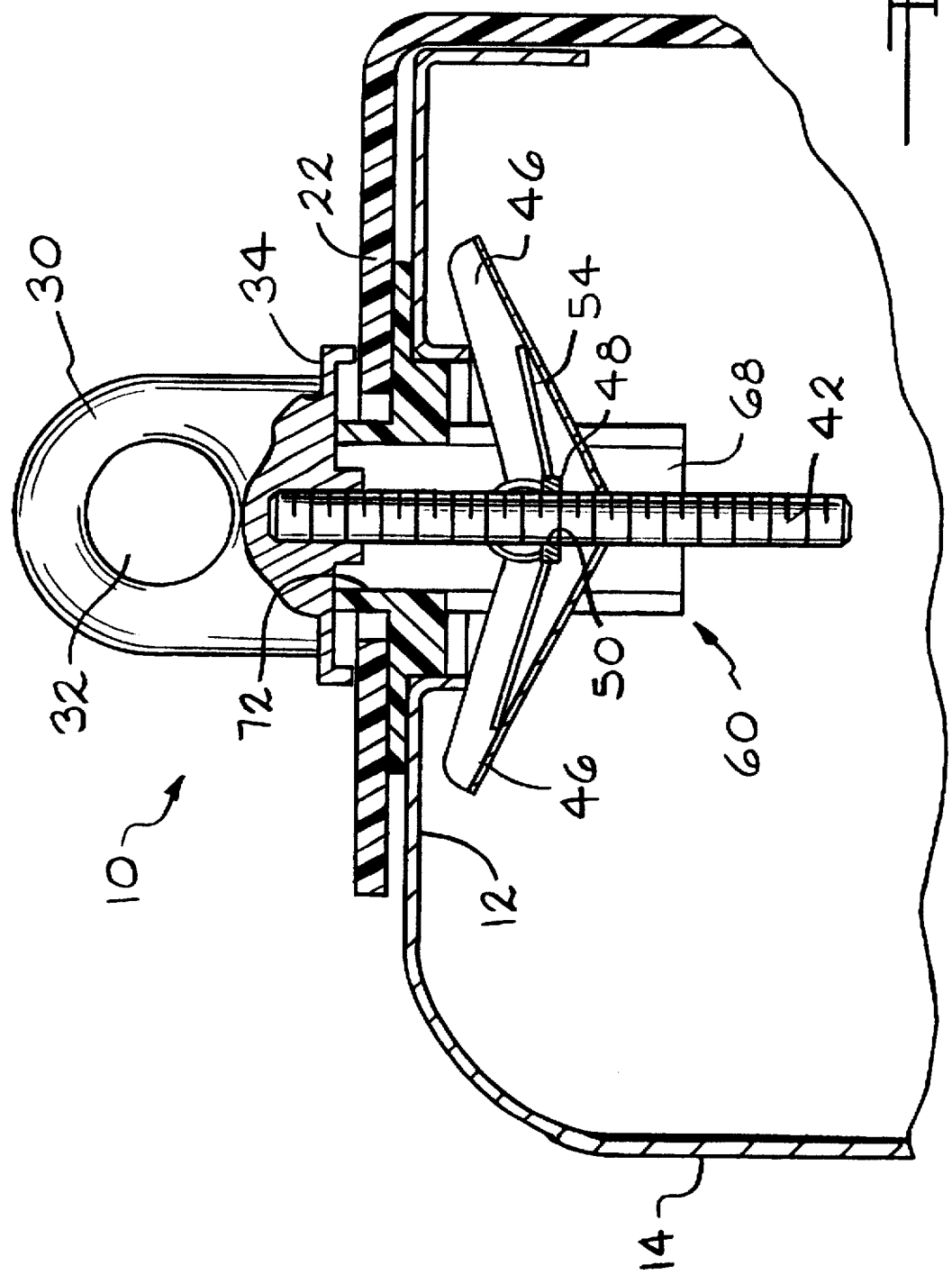
FIG. 3 is a fragmentary, sectional view of a tie down assembly according to the present invention installed in the stake opening of a pickup truck rail.

Also, as illustrated in FIG. 3, a compression spring 54 biases the wings 46 of the toggle assembly 44 into an outwardly extended position as illustrated in FIGS. 2 and 3. A region of the threaded rod 42 is preferably dipped in or treated with a friction augmenting material 56 such as nut securing or retaining material. The purpose of this material 56 will be explained below.

The tie down assembly 10 also includes a base member 60 which is preferably molded or formed of polypropylene, polyethylene or other similar material. The base member 60 includes a generally rectangular plate or flange 62 which is preferably both longer and wider than the corresponding dimensions of any stake opening 18 with which it will be used. At a minimum, it must be at least longer or wider than the corresponding dimensions of the stake opening 18 so that it will remain on the rail 12 and not fall into the stake opening 18.

Integrally formed with plate or flange 62 of the base member 60 is a smaller centering plate or projection 64 which preferably defines a width and length just slightly smaller than the corresponding dimensions of the stake opening 18 such that the base member 60 will be positively positioned on the truck rail 12 when the centering projection 64 is positioned within the stake opening 18. The edge of the centering projection 64 preferably, though not necessarily, defines concave or re-entrant peripheral channel 66. The purpose of the channel 66 will be described below with reference to FIGS. 4 and 5. A pair of opposed, curved sidewalls 68, one of which is illustrated in FIG. 3, which together define a slotted or interrupted cylinder extend from the centering projection 64 and define a pair of diametrally opposed slots 70 which have a width slightly larger than the width of the wings 46 of the toggle assembly 44. The sidewalls 68 define a portion of an opening 72 which extends through the base member 60. The radial thickness of the centering projection 64 in the areas aligned axially with the opposed slots 70 may be relatively thin such that it may be partially crushed when the toggle assembly 44 is tightened down as will be explained below.

On the upper face of the flange or plate 62, that is, the face opposite the centering projection 64 and curved sidewalls 68 is a preferably circular projection 76. The circular projection 76 preferably extends a specific distance above the upper face of the base member 60. This specific distance is just slightly larger than the thickness of the bed liner 22 in the region overhanging the truck rail 12 plus the interior height of the circular flange 36. For example, if the thickness of the bed liner 22 in the region of the tie down assemblies is 0.200 inches (5.1 mm.) and the interior vertical height of a flange 36 is 0.075 inches (1.9 mm.), the height of the projection 72 will preferably be on the order of 0.290 inches (7.4 mm.) to 0.300 inches (7.6 mm.) or slightly larger. So configured, when the tie down 10 is assembled as illustrated in FIG. 3, the flange 36 does not contact the bed liner 22 but rather, allows it to move relative to the tie down assembly 10 thus permitting unrestrained expansion of the bed liner 22 and truck rail 12 without causing bowing or damage to the bed liner 22. Furthermore, by preventing the lower face of the flange 36 from contacting or clamping the upper surface of the bed liner 22, scoring or marking of the upper surface of the bed liner 22 is prevented.

Figure 4:
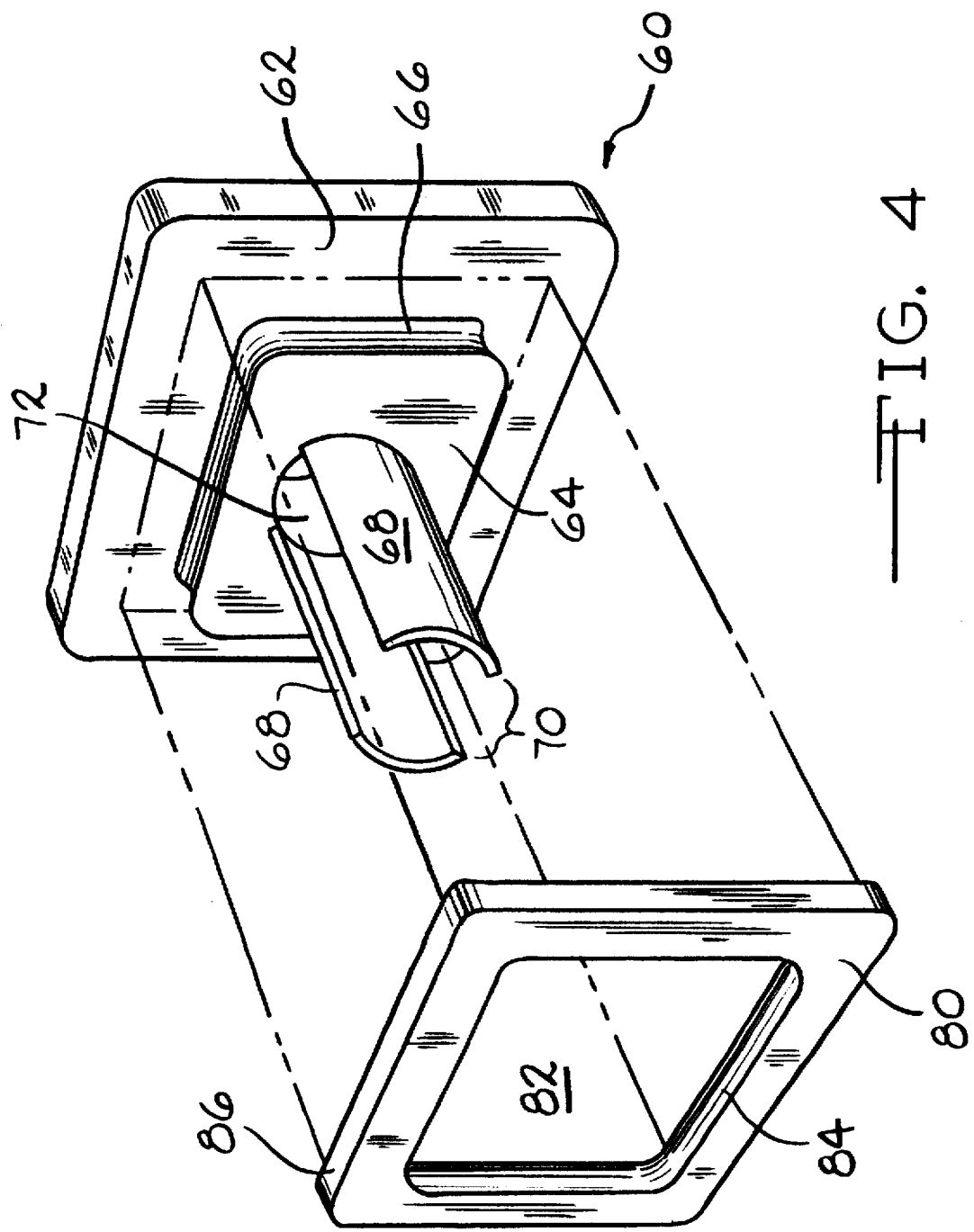
FIG. 4 is an exploded, perspective view of a portion of a tie down assembly and adapter ring according to the present invention.
Figure 5:
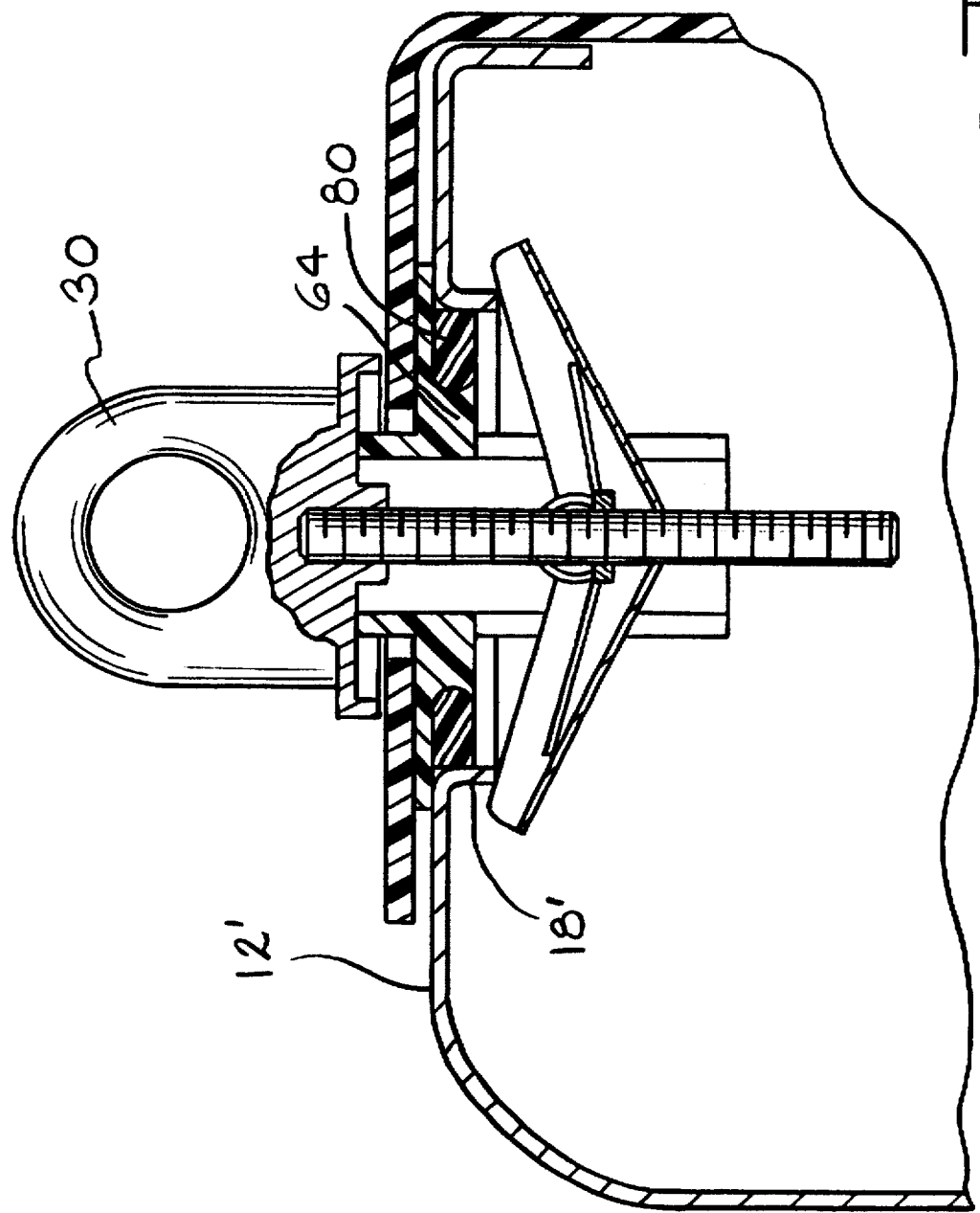
FIG. 5 is a fragmentary, sectional view of a tie down assembly with an adapter ring according to the present invention installed in the stake opening of a pickup truck rail.

Referring now to FIGS. 4 and 5, an auxiliary sizing ring 80 is illustrated. As noted above, the periphery of the centering projection 64 is intended to positively position or locate the base member 60 within the stake opening 18 of truck rail 12. However, it must be appreciated that the size of various stake openings 18 will vary depending upon the manufacturer and model of a particular pickup truck. Since it is desirable to positively position the base member 60, it is appropriate to provide a means of adapting a single base member 60 to various sizes of stake openings 18. The auxiliary ring 80 achieves this goal. As noted above, the periphery of the projection 64 is preferably though not necessarily configured to define a concave channel 66. Alternatively, the channel 66 may define any other re-entrant profile or projecting shape such as a convex edge which will facilitate ready disposition and retention of an auxiliary member 80 having a complementary configured edge thereupon.

The auxiliary ring 80 thus preferably includes a rectangular opening 82 which is defined by a rectangular edge 84 having a profile such as a convex profile which is complementary to the concave profile of the peripheral edge 66 of the base member 60. Thus, as noted, the auxiliary ring 80 may be readily snapped over the projection 64 and the auxiliary ring 80 will be retained thereupon. The periphery 86 of the auxiliary ring 80 is sized to fit within a particular stake opening 18' as will be readily understood. Auxiliary rings 80 may thus be fabricated with a standard interior opening 82 to fit upon the projection 64 and define various sizes and shapes of exterior peripheries 86. Thus, a single base member 60 may be readily adapted for use with a wide variety of vehicles having disparate sizes and shapes of stake openings 18'. While the auxiliary ring 80 is preferably fabricated of polypropylene, polyethylene or other similar material which is the same as the base member 60, it will be readily appreciated that the auxiliary ring 80 may be formed of an elastomeric material. The auxiliary ring 80 may also be fabricated of metal and if so fabricated may take the form of a snap ring having a generally circular cross-section which may be readily formed of wire or other standard metal bar stock, for example, having a square, oval or a rectangular cross-section.

As illustrated in FIG. 5, the auxiliary ring 80 seats snugly against the projection 64 and is positively received within the stake opening 18' of a truck rail 12'.

Installation of the tie down assembly 10 is straightforward. Before a bed liner 22 is positioned in the truck bed 24, the base member 60 of a tie down assembly 10 is positioned within the stake opening 18 to determine if the centering projection 64 fits relatively snugly therewithin. If there is significant longitudinal or transverse play, an auxiliary ring 80 having an appropriate peripheral size and shape which matches the configuration of the stake opening 18 will be secured to the base member 60 and concave channel 66. Then the base member 60 may be installed within the stake opening 18. Next, the bed liner 22 is placed over the base member 60 and the apertures 26 aligned with the stake openings 18 of the pickup truck 16 and the base members 60.

An eyelet member 30 having a spring biased toggle assembly 44 disposed on the elongate threaded rod 42 is then inserted into the opening 72 preferably so that the wings 46 of the toggle assembly 44 engage the curved sidewalls 68 rather than immediately snapping open when they encounter the opposed slots 70. Aligning the wings 46 in this fashion allows the tie down assembly 10 to be test assembled and should any problems be encountered the eyelet member 30 may be readily and simply lifted back out of the base member 60. If, on the other hand, the wings 46 of the toggle assembly 44 snap open as they encounter the slots 70, it will be necessary to completely unthread the eyelet member 30 in order to disassemble the tie down assembly 10 from the toggle assembly 44.

If everything is in order, the eyelet member 30 and toggle assembly 44 are inserted into the opening 72 of the base member 60 and then rotated clockwise. During the first one hundred eighty degrees of rotation or less, the wings 46 of the toggle assembly 44 will rotate and spring open as they encounter the opposed slots 70 in the base member 60. The friction augmenting material 56 on the threaded rod 42 is placed there to ensure that sufficient torque is imparted to the toggle assembly 44 when the eyelet member 30 is rotated to cause rotation of the toggle assembly 44 into the opposed slots 70 and opening of the wings 46.

Once the wings 46 have sprung open, clockwise rotation of the eyelet member 30 is continued until the wings 46 of the toggle assembly 44 engage the underside of the base member 60 defined by the centering projection 64. The eyelet member 30 is then rotated an additional amount to provide snug interconnection between the tie down assembly 10 and truck rail 12. As noted above, the walls of the centering projection aligned with the opposed slots 70 may crush slightly to ensure retention of the tie down assembly 10.

It will be noted, however, that even when tightened down, the peripheral depending rim 36 of the circular base 34 is held above and does not contact the bed liner 22. This feature achieves two desirable design goals. First of all, it allows the bed liner 22 to move both longitudinally and transversely a small distance which is primarily intended to allow accommodation of the various thermal expansion rates of the metal truck bed 24 and the bed liner 22 which typically will be fabricated of HDPE or similar polymeric material. Second of all, such lack of engagement or spacing, as illustrated in FIGS. 3 and 5, prevents the depending rim 36 from scoring or damaging the bed liner 22.

In order to remove the tie down assembly 10, the eyelet member 30 need only be rotated counterclockwise until such time as the toggle assembly 44 becomes disengaged from the elongate rod 42. At this time the toggle assembly 44 will fall into the truck bed 24, below the truck rail 12 and adjacent the bed liner 22. At this time the eyelet member 30 may be lifted up and out of the base member 60 and any adjustment, service or other activity regarding the bed liner 22, truck bed 24 or tie down assemblies 10 may be undertaken.

The foregoing disclosure is the best mode devised by the inventors for practicing this invention. It is apparent, however, that devices incorporating modifications and variations will be obvious to one skilled in the art of vehicle tie down assemblies. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A tie down assembly for installation in a stake opening of a truck comprising, in combination,
   - a base member having a flange portion, a projection extending from said flange portion for disposition in such stake opening, an opening extending through said flange portion and said projection and a pair of spaced-apart members extending from said projection and defining a pair of opposed slots,
   - a tie down member defining an eyelet and having a threaded member and a toggle assembly having a pair of wings disposed on said threaded member,
   - whereby said toggle assembly and said threaded member may be inserted into said opening and said wings of said toggle assembly are disposed in said opposed slots to retain said tie down member in said base member.

2. The tie down assembly of claim 1 further including a second projection on said base member opposite said projection for spacing said tie down member from said flange portion.

3. The tie down assembly of claim 1 wherein said projection defines walls adjacent and aligned with said slots and said walls are sufficiently thin that tightening of said toggle assembly may partially crush said walls.

4. The tie down assembly of claim 1 wherein said tie down member is fabricated of metal and said base member is fabricated of polypropylene.

5. The tie down assembly of claim 1 wherein said projection has length and width substantially equal to the length and width of such stake opening.

6. The tie down assembly of claim 1 wherein said flange portion has length or width greater than the length or width of such stake opening.

7. The tie down assembly of claim 1 further including an auxiliary spacing ring disposed about said projection, said projection and said ring including complementary retaining structures.

8. A tie down assembly for installation in an opening of a pickup truck rail comprising, in combination,
   - a base member having a flange portion, a projection extending from said flange portion for disposition in such rail opening, an opening extending through said flange portion and said projection and a pair of spaced-apart members extending from said projection and defining a pair of opposed slots,
   - a tie down member defining an eyelet and having an elongate threaded member and a toggle assembly disposed on said threaded member, said toggle assembly including a pair of wing members biased away from said threaded member, said wings of said toggle assembly capable of being disposed in said opposed slots to retain said tie down member in said base member.

9. The tie down assembly of claim 8 further including a second projection on said base member opposite said projection for spacing said tie down member from said flange portion.

10. The tie down assembly of claim 8 wherein said projection defines walls adjacent and aligned with said slots and said walls are sufficiently thin that tightening of said toggle assembly may partially crush said walls.

11. The tie down assembly of claim 8 wherein said flange portion has length or width greater than the length or width of such rail opening.

12. The tie down assembly of claim 8 wherein said projection has length and width substantially equal to the length and width of such rail opening.

13. The tie down assembly of claim 8 further including an auxiliary spacing ring disposed about said projection, said projection and said ring including complementary retaining structures.

14. The tie down assembly of claim 8 wherein said tie down member is fabricated of metal and said base member is fabricated of polypropylene.

15. A tie down assembly for installation in an opening of a truck rail comprising, in combination, a base member having a flange portion, a projection extending from said flange portion for disposition in such rail opening, an opening extending through and defined by said flange portion and said projection and a pair of spaced-apart members extending from said projection and defining a pair of opposed slots, a tie down member defining an eyelet and having an elongate threaded rod and a toggle assembly having wings and disposed on said threaded rod, said wings of said toggle assembly capable of being disposed in said opposed slots to retain said tie down member in said base member.

16. The tie down assembly of claim 15 further including a second projection on said base member opposite said projection for spacing said tie down member from said flange portion.

17. The tie down assembly of claim 15 wherein said projection defines walls adjacent and aligned with said slots and said walls are sufficiently thin that tightening of said toggle assembly may partially crush said walls.

18. The tie down assembly of claim 15 wherein said flange portion has length or width greater than the length or width of such rail opening.

19. The tie down assembly of claim 15 wherein said projection has length and width substantially equal to the length and width of such rail opening.

20. The tie down assembly of claim 15 further including an auxiliary spacing ring disposed about said projection, said projection and said ring including complementary retaining structures.

21. The tie down assembly of claim 15 wherein said tie down member is fabricated of metal and said base member is fabricated of polypropylene.

* * * * *